United States Patent [19]
Petrides

[11] Patent Number: 4,996,947
[45] Date of Patent: Mar. 5, 1991

[54] BIRD FEEDER FOR GOLDFINCHES

[76] Inventor: George H. Petrides, 7518 Old Chester Rd., Bethesda, Md. 20817

[21] Appl. No.: 508,569

[22] Filed: Apr. 13, 1990

[51] Int. Cl.⁵ .............................................. A01K 39/01
[52] U.S. Cl. ................................... 119/57.9; 119/57.8
[58] Field of Search .................... 119/57.8, 57.9, 52.2, 119/52.3, 52.4

[56] References Cited

U.S. PATENT DOCUMENTS

| | | | |
|---|---|---|---|
| 2,306,312 | 12/1942 | Hyde | 119/57.8 |
| 3,399,650 | 9/1968 | Goodman | 119/57.9 X |
| 4,026,244 | 5/1977 | Salick | 119/57.8 |
| 4,201,155 | 5/1980 | Hyde, Jr. | 119/57.8 |
| 4,215,652 | 8/1980 | Kerscher | 119/51 R |
| 4,259,927 | 4/1981 | Clarke | 119/51 R |
| 4,318,364 | 3/1982 | Bescherer | 119/57.8 |
| 4,327,669 | 5/1982 | Blasbalg | 119/57.8 |
| 4,706,851 | 11/1987 | Hegedus et al. | 222/106 |
| 4,829,934 | 5/1989 | Blasbalg | 119/52 R |

Primary Examiner—Gene Mancene
Assistant Examiner—R. Thomas Price
Attorney, Agent, or Firm—Foley & Lardner, Schwartz, Jeffery, Schwaab, Mack, Blumenthal & Evans

[57] ABSTRACT

A feeder for goldfinches comprising a hollow body for receiving and retaining feed, at least one perch on and exterior to the body, and a feeding opening positioned below and cooperating with the perch so that the opening is accessible only to a gold finch feeding upside down. Since the goldfinch is able to feed while hanging upside down and the housefinch cannot, the feeder accommodates the goldfinch and excludes other birds including the housefinch. The invention further comprises a method of attracting goldfinches and excluding housefinches comprising providing a feeder according to the invention, filling it with the appropriate goldfinch feed and hanging it.

9 Claims, 1 Drawing Sheet

U.S. Patent  Mar. 5, 1991  Sheet 1 of 1  4,996,947
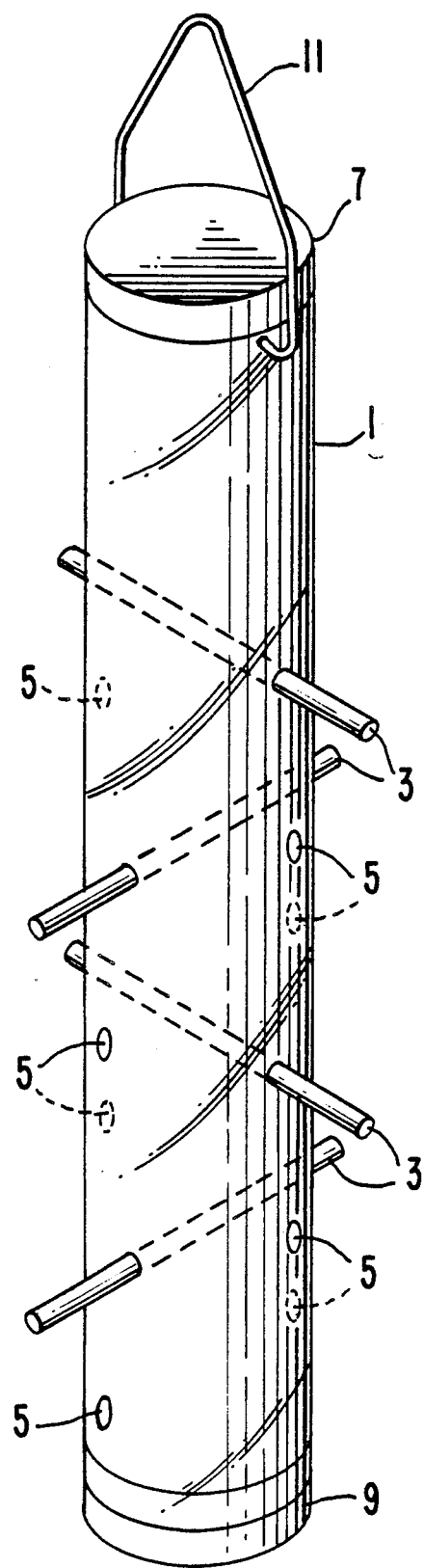

BIRD FEEDER FOR GOLDFINCHES

BACKGROUND OF THE INVENTION

1. Field of the Invention

The present invention is a bird feeder with feeding openings positioned below the perch so that goldfinches are attracted to the feeder but house finches and other undesired birds are excluded.

2. Brief Description of the Prior Art

Traditional bird feeders feature a number of perches with corresponding feeding openings positioned at some distance directly below each perch. Blasbalg, U.S. Pat. No. 4,829,934, discloses a bird feeder of the general type, that is, a cylindrical tubular feed container with at least one feeding aperture above a perch that extends outwardly from the container. The Blasbalg feeder does not attempt to attract one type of bird or to discriminate among birds of different types.

Another feeder, Salick, U.S. Pat. No. 4,026,244, is a hanging bird feeder made of plastic tubing. The tubing is permanently sealed at one end and open at the other end so it can be filled with seed. Perch bars, made of sticks with one pointed end, are inserted into and through the tube at a variety of horizontal positions. Both ends of the perch protrude from the tube. A second hole is pierced at a distance directly above the perch and acts as a feeding hole. The Salick feeder allows the owner of the feeder to decide the type of birds he wishes to attract by (1) varying the length of the perch bar and/or (2) varying the height above the perch of the opening. A short perch bar and an opening a short distance above the perch would only accommodate smaller species of birds.

Salick only allows the owner to choose between large birds and small birds and not between different species in the same family such as between goldfinches and house finches. The known feeders do not take into consideration the fact that birds feed a variety of positions.

The American Goldfinch prefers to feed on thistle or seed bearing plants. The goldfinch is a small bird with height between 4½ to 5½ inches and is able to feed from a variety of positions including upside down. The housefinch is a larger bird with a height of 5-5½ inches and lacks the goldfinch's ability to feed upside down.

OBJECTS AND SUMMARY OF THE INVENTION

An object of the present invention is to allow the bird feeder owner to attract goldfinches and exclude housefinches and other birds by providing feeding openings below each perch at a distance equal to the height of a feeding goldfinch or approximately 2½ inches. Since the goldfinch is able to feed while hanging upside down and the housefinch cannot, the feeder accommodates the goldfinch rather than other birds. Although other birds may have an ability similar to that of the goldfinch, size differences will prevent them from reaching the feeding opening and they will also be excluded.

The feeder of the invention has a hollow body for receiving and storing bird feed. The feed is retained in the body by providing a sealing means for the top and bottom of the feeder. At least one perch is positioned on and exterior to the body with a corresponding feeding opening positioned below. The opening is positioned below the perch so that it is accessible from the perch only to a goldfinch feeding upside down.

It is a further object of the invention to provide a method for attracting goldfinches and excluding housefinches by providing a feeder according to the invention, filling the feeder with goldfinch feed and hanging the feeder.

DESCRIPTION OF THE FIGURE

The nature and other objects and advantages of the present invention will be apparent from the following detailed description of the preferred embodiment which is illustrated in the drawing, wherein:

The FIGURE is a perspective view of the body, perches and feeding openings.

DETAILED DESCRIPTION OF THE PREFERRED EMBODIMENTS

The FIGURE shows the general structure of the goldfinch feeder of the present invention. A cylindrical tube forms the body (1) of the feeder. This tube may be made from a variety of material including clear plastic. The feeder has bottom in which a plug (9) is inserted to seal that end and a top over which a removable cap 7) is fitted. Both the plug (9) and the cap (7) are preferably made of pressed aluminum but can also be formed from any other suitable material. When the cap (7) is removed, the body (1) can receive bird feed in the form of thistle, niger seed or other suitable goldfinch feed. Together the plug (9) and the cap (7) retain the feed in the body.

At the top of the body (1), a hanging means (11) is attached so that the feeder may be hung from a branch or other structure. The hanging means (11) can be wire or aluminum hanger. Both ends of the hanging means (11) are preferably hooked so that once they are inserted through the tube they securely support the feeder.

A plurality of perches (3) are inserted through the body (1) along a diameter of the tube. The perches (3) alternate so that a first is inserted along one diameter and a second is inserted along a second diameter which is perpendicular to the first. Each perch (3) has approximately a quarter inch diameter and a length greater than a diameter of the body (1). Both ends of the perch (3) protrude from the body. The perches (3) may be made from dowels or plastic rods.

A plurality of feeding openings (5), one opening corresponding to each perch, (3) are positioned beneath each perch at a distance approximately equal to 2½ inches. The openings are located approximately directly below the corresponding perch. This distance corresponds to the height of a feeding goldfinch hanging upside from the perch.

It will be appreciated that the above description and accompanying drawing are merely illustrative of the application the principles of the present invention are not limiting. Numerous other arrangements which embody the principles in this invention and fall within the scope and spirit may be readily devices by those skilled in the art. Accordingly, the invention is not limited by the foregoing description, but is only limited by the scope of the appended claims.

What is claimed is:

1. A bird feeder for goldfinches, comprising:
   (a) a hollow body having a top and a bottom, the body being able to receive and retain bird feed;

(b) a plurality of perches and a corresponding number of feeding openings in the hollow body, including at least one uppermost perch and a corresponding feeding opening and at least one lowermost perch and a corresponding feeding opening, the uppermost feeding opening being at a distance below the uppermost perch, and the lowermost feeding opening being at a distance below the lowermost perch;

(c) wherein the distance will accommodate a goldfinch feeding upside down and will not accommodate a bird feeding upright.

2. A bird feeder according to claim 1, wherein the distance equals 2½ inches.

3. A bird feeder according to claim 1, further comprising:
   (a) a cap removably fitted over the top of said body for filling the body with feed;
   (b) a plug sealingly inserted in the bottom of said body for retaining the feed; and
   (c) a means for hanging said body attached to the top thereof.

4. A bird feeder according to claim 1, wherein the body is cylindrical.

5. A bird feeder according to claim 1, wherein the perches are rod-shaped with a pair of ends.

6. A bird feeder according to claim 5, wherein the perches are inserted through the body so that the ends extend beyond the body.

7. A plurality of perches according to claim 6, wherein each perch alternately bisects the body along a first and second diameter.

8. A method of attracting gold finches and excluding housefinches, comprising:
   (a) providing a hollow body having a top and a bottom;
   (b) placing a plurality of perches and a corresponding number of feeding openings in the hollow body, including at least one uppermost perch and a corresponding feeding opening and at least one lowermost perch and a corresponding feeding opening, the uppermost feeding opening being at a distance below the uppermost perch, and the lowermost feeding opening being at a distance below the lowermost perch, wherein the distance will accommodate a goldfinch feeding upside down and will not accommodate a bird feeding upright;
   (c) filling the hollow body with goldfinch feed; and
   (d) hanging the body wherein the uppermost perch is positioned above the lowermost perch.

9. A method according to claim 8, wherein the feed is thistle, also known as niger seed.

* * * * *